United States Patent
Park et al.

(10) Patent No.: US 8,331,046 B2
(45) Date of Patent: Dec. 11, 2012

(54) FOCUSING DEVICE FOR BEAM PROJECTOR

(75) Inventors: Joong-Wan Park, Gyeonggi-do (KR); Mun-Kue Park, Gyeonggi-do (KR)

(73) Assignee: Samsung Electronics Co., LTD (KR)

( * ) Notice: Subject to any disclaimer, the term of this patent is extended or adjusted under 35 U.S.C. 154(b) by 39 days.

(21) Appl. No.: 12/888,056

(22) Filed: Sep. 22, 2010

(65) Prior Publication Data

US 2011/0069405 A1    Mar. 24, 2011

(30) Foreign Application Priority Data

Sep. 22, 2009 (KR) .................. 10-2009-0089669

(51) Int. Cl.
*G02B 7/02* (2006.01)

(52) U.S. Cl. ......... 359/823; 359/808; 359/811; 359/819

(58) Field of Classification Search ............... 359/823
See application file for complete search history.

(56) References Cited

U.S. PATENT DOCUMENTS

| 4,318,593 A | 3/1982 | Tsuji et al. |
| 2006/0164610 A1 * | 7/2006 | Yoshikawa ................. 353/101 |

FOREIGN PATENT DOCUMENTS

JP    2006-208506    8/2006

* cited by examiner

*Primary Examiner* — James Jones
(74) *Attorney, Agent, or Firm* — The Farrell Law Firm, P.C.

(57) ABSTRACT

A focusing device for a beam projector which includes a casing; a lens holder having at least one lens which is movable forward or backward in the direction of the optical axis; a movable member located at a side of the lens holder to be movable parallel to the direction of the optical axis together with the lens holder; and a control knob located adjacent to the lens holder and rotatably coupled on the casing.

15 Claims, 7 Drawing Sheets

FOCUSING DEVICE FOR BEAM PROJECTOR

PRIORITY

This application claims priority under 35 U.S.C. §119(a) to an application entitled "Focusing Device For Beam Projector" filed in the Korean Industrial Property Office on Sep. 22, 2009, and assigned Serial No. 10-2009-0089669, the contents of which are hereby incorporated by reference.

BACKGROUND OF THE INVENTION

1. Field of the Invention

The present invention relates generally to a beam projector, and more particularly to a focusing device for an ultra-compact beam projector that is mountable on a compact appliance, such as a portable terminal.

2. Description of the Related Art

A beam projector is a device which includes a light source, one or more Liquid Crystal Display (LCD) panels, one or more lenses, or the like, wherein light projected from the light source is transmitted through the LCD panels to project an image displayed on the LCD panels onto a screen. The number of the LCD panels and the number of the lenses may vary according to the type of beam projector.

The beam projector may be used to display an image which is larger than possible on the compact appliance. As a result, the beam projector is useful in conferences, presentations or the like. Portable terminals equipped with ultra-compact beam projectors have recently become commercially available. Such portable terminals equipped with a beam projector are useful to businesses who frequently make business trips or attend conferences.

A beam projector that is designed to be mounted on a compact appliance, such as a portable terminal, is generally provided with a focusing device employing a control knob, such as a dial.

Focusing devices provided in conventional projectors may convert rotary movement of a control knob into rectilinear movement of a lens holder through a rack and pinion gear, or through a connecting rod.

Using a rack and pinion gear has an advantage in that a user's manipulation may be precisely transmitted so as to move the lens holder forward or backward. However, if the user applies excessive force when the lens holder has arrived at the end of the available space, the teeth of the rack and pinion gear may be damaged. Moreover, a rack and pinion gear is provided in a compact portable terminal are often damaged when the portable terminal is dropped.

Using a connecting rod has an advantage in that the possibility of damaging the connecting rod is relatively low. However, there is a disadvantage in that since the moving space of the connecting rod is maintained in an opened state, internal structures, such as the lens holder, are exposed to an external environment. Therefore, it is difficult to produce a high-quality focusing device or a beam projector itself. In such designs, the focusing device or the beam projector is vulnerable to external risks, such as water permeation. Moreover, since the connecting rod should be arranged in relation to the moving path of the lens holder, it must be sufficiently long, which is an obstacle to reduce the size of such a beam projector.

SUMMARY OF THE INVENTION

Accordingly, the present invention has been made to solve at least the above-mentioned problems occurring in the prior art, and provides a focusing device for a beam projector, wherein even if the focusing device is equipped in a miniaturized appliance, such as a portable terminal, the focusing device can precisely transmit a user's manipulation for moving a lens holder forward or backward, and the movable extent of the lens holder can be limited by the construction of the control knob itself, thereby reducing the possibility of damaging the focusing device.

Also, the present invention provides a focusing device for a beam projector which can be fabricated in a simple construction.

Additionally, the present invention provides a focusing device for a beam projector which includes a sealed inner space so that the interior of the lens holder is prevented from being exposed to an outer environment, thereby enhancing the endurance and reliability of the beam projector.

In accordance with an aspect of the present invention, there is provided a focusing device for a beam projector, including a casing; a lens holder having at least one lens, and being movable forward or backward in the direction of the optical axis of the lens within the casing; a movable member provided at a side of the lens holder to be movable parallel to the direction of the optical axis together with the lens holder; and a control knob adjacent to the lens holder and rotatably coupled on the casing, wherein the movable member is connected to the control knob in such a manner that as the control knob is rotated, the movable member is moved parallel to the direction of the optical axis, thereby moving the lens holder forward or backward in the direction of the optical axis.

The focusing device for a beam, as described above, has an advantage in that it can be easily miniaturized since a control knob and a lens holder are installed adjacent to each other. In addition, since a coupling protrusion is formed on the control knob and a coupling piece is located on a movable member fixed to the lens holder, wherein a bore capable of fully receiving the movable extent of the coupling protrusion is formed through the coupling piece, it is possible to prevent the coupling protrusion and the lens holder from being damaged. That is, since the movable extent of the coupling protrusion according to the rotation of the tuning piece is limited to a predetermined section, the lens holder is repeatedly moved forward or backward within the predetermined extent even if the control knob is endlessly rotated. In addition, the casing for installing the focusing device is provided with a low-friction film on the inner surface thereof, and a partition member formed on the movable member is provided on the outer surface of the casing, thereby sealing the casing. As a result, the interior of the casing can be protected from the external environment.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, certain embodiments of the present invention will be described with reference to the accompanying drawings. In the following description, a detailed description of known functions and configurations incorporated herein will be omitted where it may confuse the subject matter of the present invention.

Figure 1:
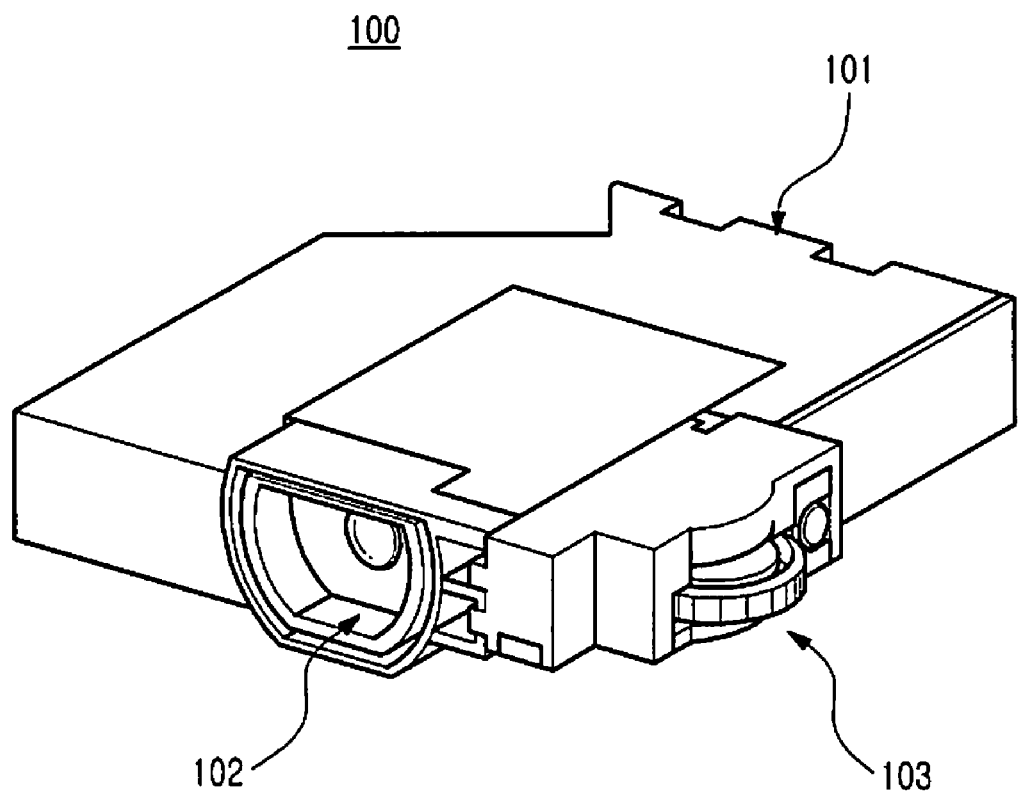
FIG. 1 is a perspective view illustrating a focusing device of a beam projector in accordance with an embodiment of the present invention.
Figure 2:
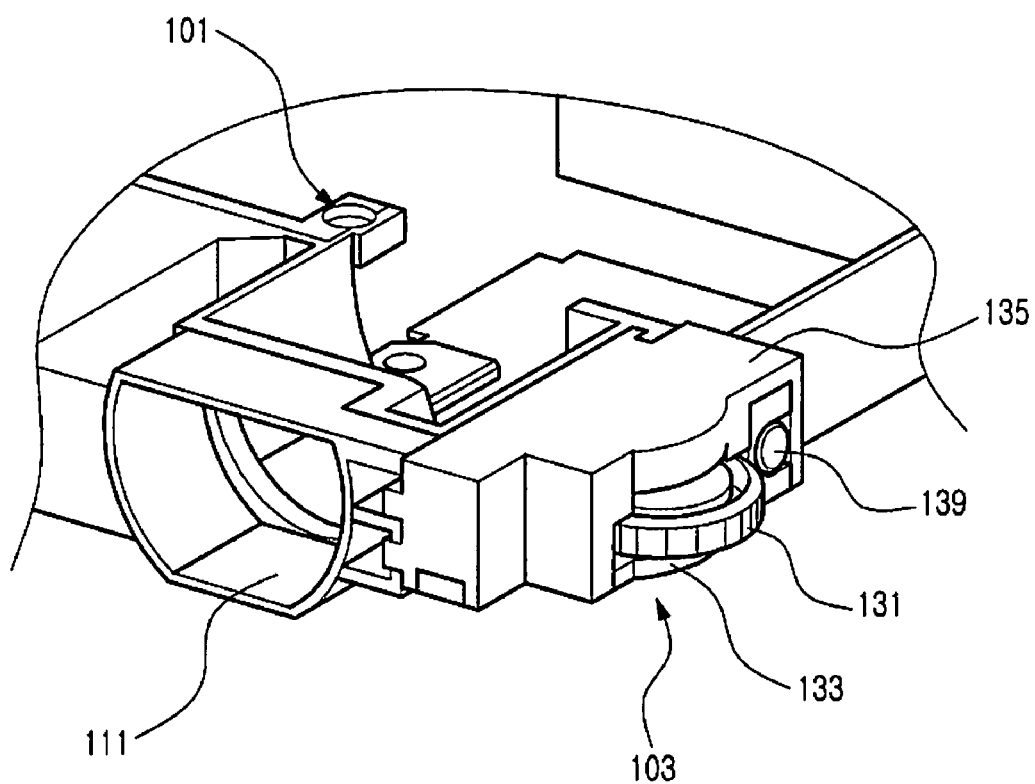
FIG. 2 illustrates an enlarged perspective view of the focusing module shown in FIG. 1.

FIG. 1 is a perspective view illustrating a focusing device of a beam projector in accordance with an embodiment of the present invention, and FIG. 2 illustrates an enlarged perspective view of the focusing module shown in FIG. 1.

As shown in FIGS. 1 and 2, a focusing device in accordance with an embodiment of the present invention includes a focusing module 103 for moving a lens holder 102 forward or backward, which is mounted on a side of a casing 101. Here, the focusing module 103 is located adjacent to the lens holder 102. In particular, the focusing module 103 is mounted on the outer surface of the casing 101, and the lens holder 102 is mounted in a state in which the lens holder 102 is able to slide while coming in contact with the inner surface of the casing 101 corresponding to the outer surface.

The casing 101 may form a part of the focusing device 100, as illustrated in FIG. 1, or may form the complete housing of the beam projector. That is, an LCD panel, a light source, a circuit device for controlling them, or the like may be provided within the casing 101. However, since the present invention relates to a focusing device, the detailed description of these components will be omitted.

An opening 111 is formed on the front side of the casing 101, for providing a path for light projected from the light source, after passing through the lens holder.

The lens holder 102 includes at least one lens. The lens holder 102 is arranged to the optical axis of the light projected from the light source within the casing 101, and moves forward or backward along the optical axis. The lens holder 102 may be guided forward or backward within the casing 101 by guide structures, which are not shown in FIGS. 1 and 2. For example, such guide structures may be formed by a protrusion on an outer circumferential surface of the lens holder, and a guide rail 129 (see FIG. 7), which is arranged along the direction of the optical axis, on the casing 101. The guide rail 129 is movable through the protrusion on the lens holder 102. Alternatively, if the outer circumferential surface of the lens holder 102 is formed in a linear shape along the direction of the optical axis, it is possible to omit such a guide structure by forming a space corresponding to the shape of the lens holder 102 along the direction of the optical axis within the casing 101.

The focusing module 103 is mounted on a side wall adjacent to the opening 111 on the casing 101, and includes a control knob 131 and a movable member 104 which are housed between a lower cover 133 and an upper cover 135, respectively.

Figure 3:
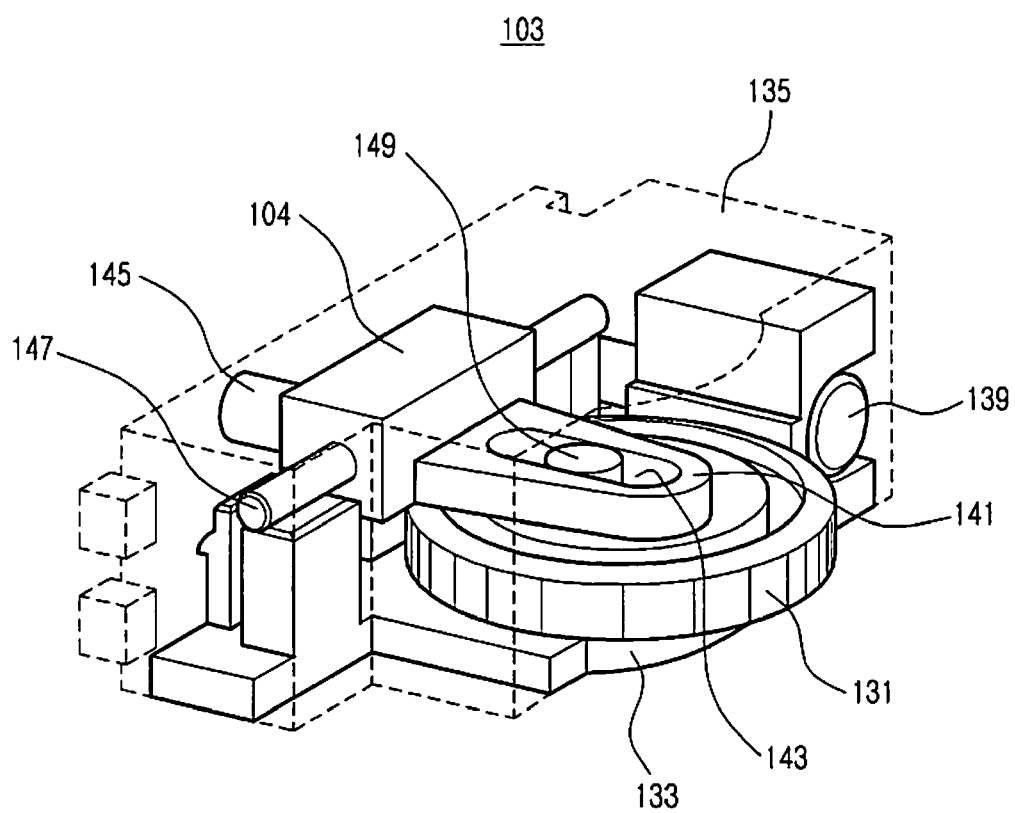
FIG. 3 is a perspective view illustrating a part of the focusing module shown in FIG. 2.

FIG. 3 is a perspective view illustrating a part of the focusing module shown in FIG. 2.

Referring to FIG. 3, the lower cover 133 is fixed to the casing by fasteners, such as screws 139. A person skilled in the art will appreciate that the lower cover 133 may alternatively be fixed to the casing 101 through various methods, such as welding, double injection molding, and adhesion, depending on the material of the lower cover 133.

The control knob 131 is rotatably mounted on the lower cover 133, such that a part of its outer circumferential surface projects outward from the lower cover 133. At one side of the control knob 131, there is provided a rotary pin (not shown), which is coupled to the lower cover 133 and provides the center of rotation of the control knob 131. At the other side of the control knob 131, a cylindrical coupling protrusion 149 is formed. The coupling protrusion 149 is formed at a position offset from the rotation axis of the control knob 131, so that the coupling protrusion 149 will turn about the rotation axis of the control knob 131 when the control knob 131 is rotated. Therefore, the coupling protrusion 149 is limited in terms of the movable extent in the direction of the optical axis. That is, the movable extent of the coupling protrusion 149 in the direction of the optical axis is limited to within two times of the turning radius.

The movable member 104 is housed between the lower and upper covers 133 and 135 may move forward or backward in the direction of the optical axis. A guide pin 147 arranged parallel to the optical axis is located on the lower cover 133, wherein when the upper cover 135 is assembled to the lower cover 133, the guide pin 147 is fixed to the inside of the upper cover 135. However, the guide pin 147 may be fixed to each of the lower and upper covers 133 and 135, and may be fixed between the lower and upper covers 133 and 135 due to the engagement of the lower and upper covers 133 and 135. The guide pin 147 extends through the movable member 104, and the movable member 104 is moved forward or backward within the space formed between the lower and upper covers 133 and 135 while being guided by the guide pin 147.

The movable member 104 includes a coupling piece 141 extending from one side thereof, and an anchoring pin 145 provided on the other side. The anchoring pin 145 protrudes to the outside of the lower and upper covers 133 and 135. The anchoring pin 145 extends into the casing and is fixed to the lens holder 102. Threads are formed on an end of the anchoring pin 145 so that the anchoring pin 145 can be fastened to the lens holder 102. The coupling piece 141 has a bore 145 extending in a direction perpendicular to the optical axis, wherein when the movable member 104 is positioned between the lower and upper covers 133 and 135, the coupling protrusion 149 is positioned within the bore 143. Here, the width of the bore 143 corresponds to the cross-sectional diameter of the coupling protrusion, and the length of the bore 143 is a size which can sufficiently receive the moving extension of the coupling protrusion 149 in the direction perpendicular to the optical axis. For example, the length of the bore 143 is at least two times the turning radius of the coupling protrusion 149, and the center of the bore 143 is positioned at the center of rotation of the coupling protrusion 149, i.e. on the axis of rotation of the control knob 131.

When the control knob 131 is rotated, the coupling protrusion 149 is moved along the extending direction of the bore 143 within the bore 143, and moved in the direction of the optical axis as the coupling protrusion 149 pushes against the opposite inner walls of the bore 143. As the coupling protrusion 149 pushes against the opposite inner walls of the bore 143 and moves in the direction of the optical axis, the coupling piece 141 and the movable member 140 move forward or backward. Even if the control knob 131 is continuously turned in one direction only, the movable member 104 can be moved forward or backward within a distance corresponding to two times of the turning radius of the coupling protrusion 149, i.e. a diameter of the turning trajectory of the coupling protrusion 149.

Figure 4:
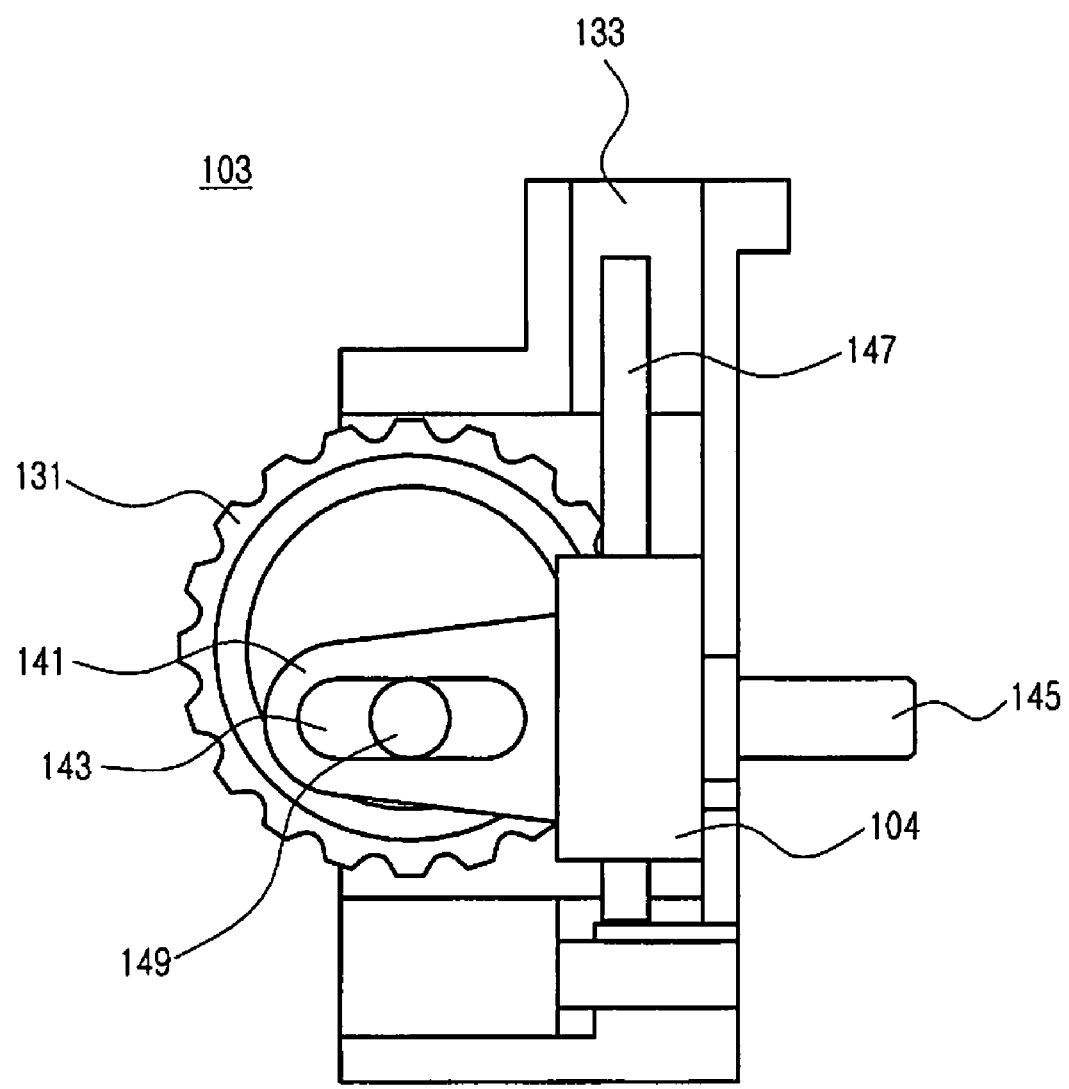
FIGS. 4 and 5 illustrate the focusing module shown in FIG. 2.
Figure 5:
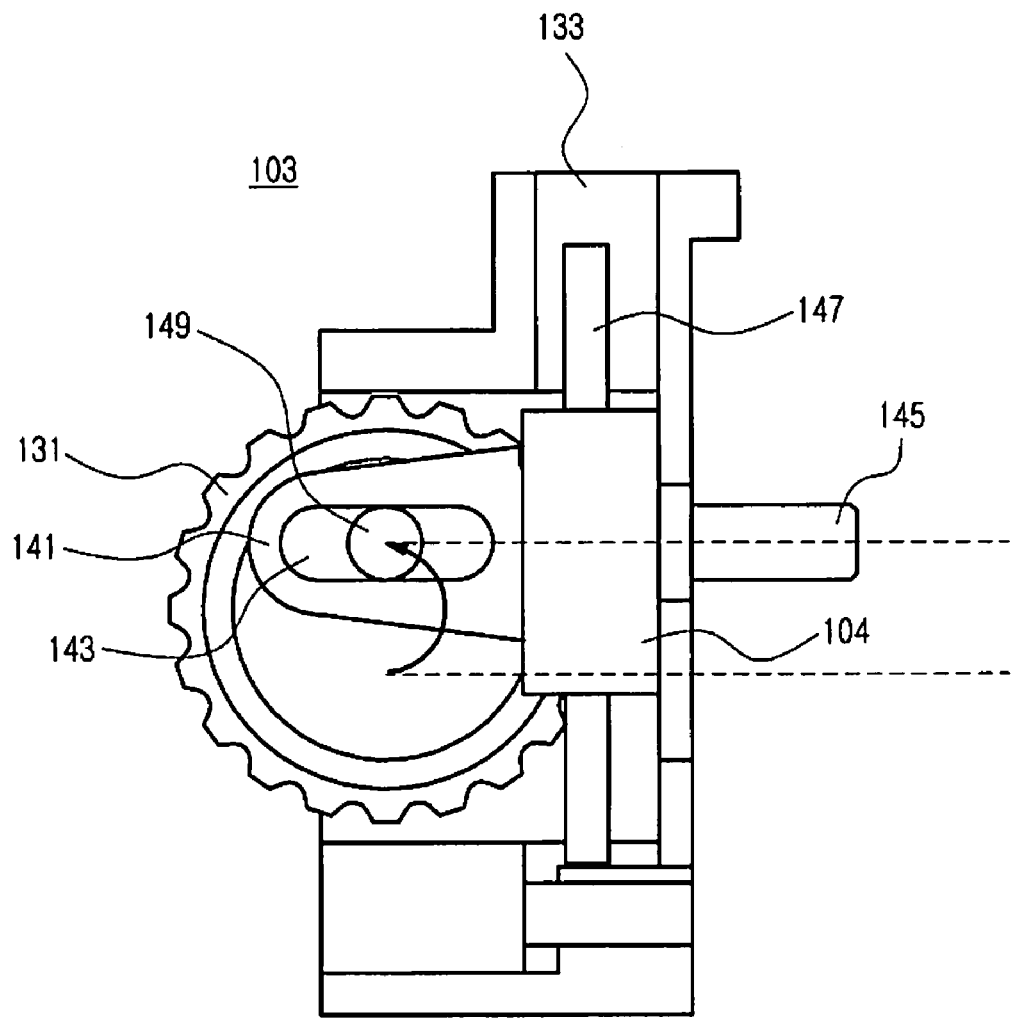

FIGS. 4 and 5 describe the operation of the focusing module 103. Specifically, FIG. 4 shows a state in which the lens holder 102 is moved backward into the casing 101 to some limit point (hereinafter, referred to as "first point"), and FIG. 5 shows a state in which the lens holder 102 is moved forward toward the outside of the casing 101 to some other point (hereinafter, referred to as "second point").

At the first point, the control knob 131 may be rotated either clockwise or counterclockwise, and the lens holder 102 is moved forward to the outside of the casing regardless of which direction the control knob 131 is rotated. At the second point, the control knob 131 may be still rotated either clockwise or counterclockwise, and the lens holder 102 will move backward to the inside of the casing 101 regardless of which direction the control knob 131 is rotated.

Figure 6:
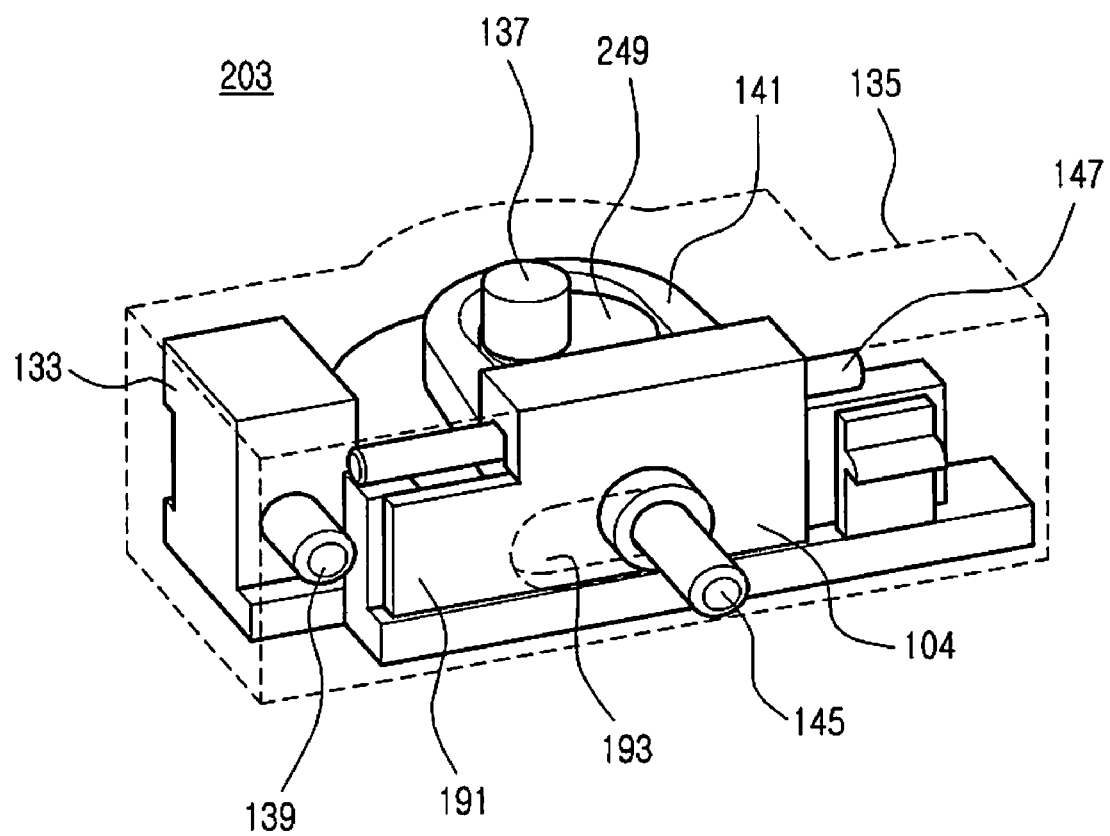
FIG. 6 is a perspective view illustrating a part of a focusing module of a beam projector in accordance with another embodiment of the present invention.
Figure 7:
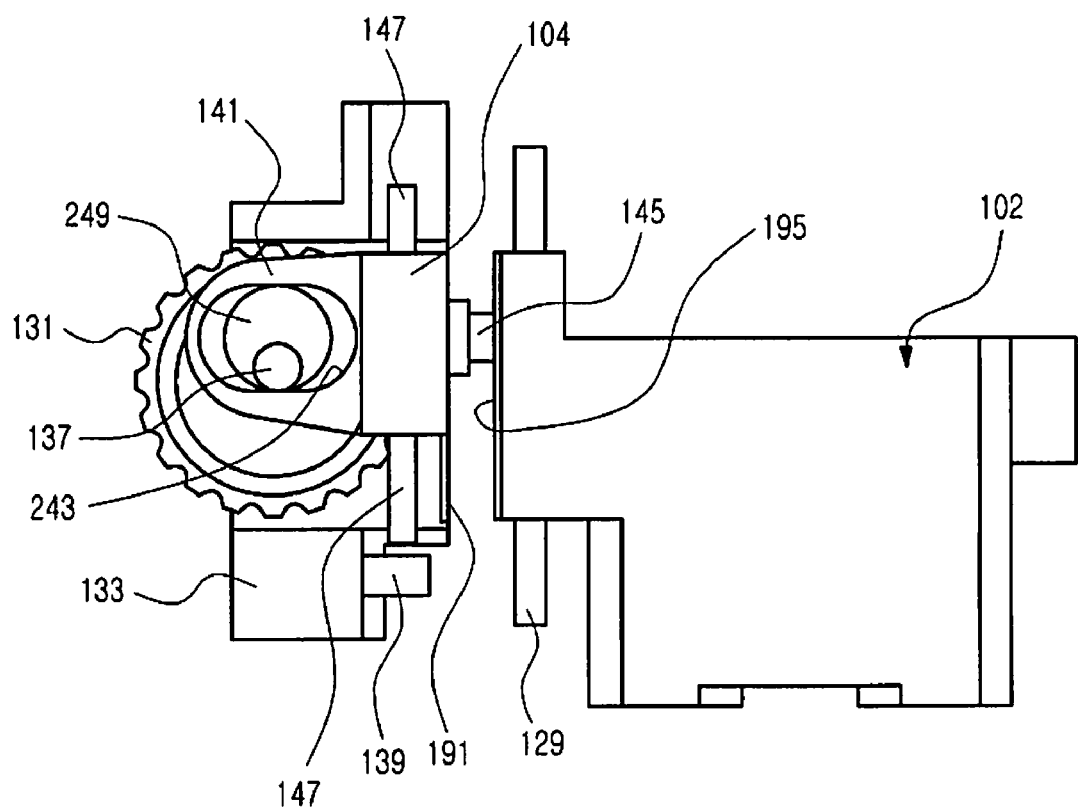
FIG. 7 illustrates an operation of the focusing module shown in FIG. 6.

FIGS. 6 and 7 show a focusing device for a beam projector in accordance with another embodiment of the present invention. It should be noted that a component which can be easily understood from the previous embodiment may be denoted with the same reference numeral that was used in the previous embodiment, or not denoted by any reference numeral, and a detailed description thereof may be also omitted.

Referring to FIGS. 6 and 7, the focusing module 203 of the focusing device is different from focusing module 103 in terms of installing a partition member 191 for closing a guide hole formed in the casing and a coupling protrusion 249 and a bore 243.

The coupling protrusion 149 in the focusing module 103 turns about the axis of rotation of the control knob 131. However, the coupling protrusion 249 focusing module 103 has a diameter larger than the coupling protrusion 149, and eccentrically rotates about the axis of rotation of the control knob 131. That is, although the coupling protrusion 249 is located on the axis of rotation of the control knob 131, its center does not align with the axis of rotation of the control knob 131. Here, rotary pins for supporting the rotation of the control knob 131 are formed on the opposite sides of the control knob 131, respectively, and the rotary pin on the one side not shown in the drawing and the rotary pin 137 on the other side are rotatably coupled to the lower cover 133 and the upper cover 135, respectively. In addition, the coupling protrusion 249 is formed on the other side of the control knob 131 to surround the rotary pin 137.

The bore 243 of the coupling piece 141 has a width corresponding to the cross-sectional diameter of the coupling protrusion 249, and the extent of forward or backward movement of the lens holder 102 is determined by the distance between a position farthest from the axis of rotation of the control knob 131 and the axis of rotation of the control knob 131 (hereinafter, this distance will be referred to as "radius of rotation"). For example, the length of the bore 243 is preferably larger than two times of the turning radius, and its center is positioned at the center of rotation of the coupling protrusion 249, i.e. on the axis of the control knob 131.

The focusing module 203 of the focusing device of the present embodiment includes a guide hole formed in the casing for providing a space within which the anchoring pin 145 is movable, and a partition member 191 for closing the guide hole. Since the anchoring pin 145 extends to the inside of the casing from the movable member 104 and is fixed to the lens holder 102, there is a guide hole 193 for providing a moving space for the anchoring pin 145 also formed in the upper cover 135. The focusing module 103 is provided with the partition member 191 to prevent foreign matter, such as dust, from entering the focusing module 203 through the guide hole 193.

As shown in FIGS. 6 and 7, the partition member 191 is located on the movable member 104 and illustrated in a form for closing the guide hole 193 formed in the upper cover 135, extending along the moving direction of the movable member 104. The upper cover 135 may be configured to be open at the part opposite to an outer surface of the casing 101 (not shown in FIG. 6 or 7), and the partition member 191 closes the guide hole formed in the casing on the outer surface of the casing 101. Therefore, the inner space of the casing 101 is sealed by the partition member 191 and is protected from the external environment.

In addition, the guide hole may be also closed on an inner surface of the casing. For example, if the lens holder 102 is slid while its circumferential surface is being kept in a closely contacted state around the guide hole formed in the casing, it is possible to prevent the inner space of the casing from being exposed to the outside through the guide hole in the casing. However, the forward or backward movement of the lens holder 102 may not be smooth, or the inner surface of the casing or the outer circumferential surface of the lens holder 102 may be worn away due to friction. In order to prevent this phenomenon, it is possible to improve lubrication to reduce frictional force caused by the forward or backward (e.g., a Teflon film) movement of the lens holder 102 by attaching a low-friction film 195 to the outer circumferential surface of the lens holder 102. Consequently, by closing the guide hole 193 by one or both of the partition member 191 and the low-friction film 195, it is possible to shut out contaminants, such as dust, from penetrating the casing.

As described above, the present invention assists the miniaturization of a focusing device, and a beam projector by providing a focusing module in close vicinity to a lens holder. In addition, by forming a coupling protrusion on a control knob, and rendering a coupling piece, which is capable of moving forward or backward together with the lens holder, to be engaged with the coupling protrusion, the coupling protrusion can move along a constant circular trajectory, even if the control knob is continuously rotated in one direction. As a result, the coupling protrusion can repeatedly move forward or backward within a predetermined extent, even if the moving extent is not separately limited.

While the present invention has been shown and described with reference to certain embodiments thereof, it will be understood by those skilled in the art that various changes in form and details may be made therein without departing from the spirit and scope of the invention as defined by the claims.

What is claimed is:

1. A focusing device for a beam projector, comprising:
   a casing;
   a lens holder including at least one lens, the lens holder being movable forward and backward in a direction of an optical axis of the lens within the casing;
   a movable member at a side of the lens holder that moves parallel to the direction of the optical axis together with the lens holder;
   a control knob adjacent to the lens holder and rotatably coupled on the casing,
   a coupling piece extending from a side surface of the movable member;
   a bore formed in the coupling piece; and
   a coupling protrusion attached to the control knob and turning about an axis of rotation of the control knob as the control knob is rotated,
   wherein the movable member is connected to the control knob in such a manner that as the control knob is rotated, the movable member moves parallel to the direction of the optical axis, thereby moving the lens holder forward and backward in the direction of the optical axis, and wherein the coupling protrusion is positioned in the bore in such a manner that as the control knob is rotated, the coupling protrusion is rectilinearly moved within the bore, and pushes against opposite inner walls of the bore, thereby moving the movable member.

2. The focusing device as claimed in claim 1, wherein the coupling protrusion has a cylindrical shape, and a width of the bore corresponds to a cross-sectional diameter of the coupling protrusion.

3. A focusing device for a beam projector, comprising:

a casing;

a lens holder including at least one lens, the lens holder being movable forward and backward in a direction of an optical axis of the lens within the casing;

a movable member at a side of the lens holder that moves parallel to the direction of the optical axis together with the lens holder;

a control knob adjacent to the lens holder and rotatably coupled on the casing;

a coupling piece extending at a side surface of the movable member;

a bore formed in the coupling piece; and a coupling protrusion located on the control knob and eccentrically rotated about an axis of rotation of the control knob as the control knob is rotated, wherein the movable member is connected to the control knob in such a manner that as the control knob is rotated, the movable member moves parallel to the direction of the optical axis, thereby moving the lens holder forward and backward in the direction of the optical axis, and wherein the coupling protrusion is positioned in the bore in such a manner that as the control knob is rotated, the coupling protrusion is rectilinearly moved within the bore, and pushes against opposite inner walls of the bore, thereby moving the movable member.

4. The focusing device as claimed in claim 3, wherein the coupling protrusion has a cylindrical shape, and a width of the bore corresponds to a cross-sectional diameter of the coupling protrusion.

5. The focusing device as claimed in claim 1, wherein the movable member is provided on the casing to be rectilinearly movable, and is fixed to the lens holder by an anchoring pin.

6. The focusing device as claimed in claim 5, further comprising:

a guide hole formed in the casing, the guide hole providing a space within which the anchoring pin is movable as the movable member is moved; and a partition member formed on the movable member so as to shut out exposure of the guide hole to outside contaminants.

7. The focusing device as claimed in claim 6, wherein the lens holder is slidable on an inner surface of the casing and comes into contact with an area surrounding the guide hole on an inner surface of the casing, so that the lens holder can shut the guide hole out of the interior of the casing.

8. The focusing device as claimed in claim 7, further comprising:

a low-friction film attached to the outer circumferential surface of the lens holder, wherein the low-friction film comes into slidable close contact with the area surrounding the guide hole.

9. A focusing device for a beam projector, comprising:

a casing;

a lens holder including at least one lens, the lens holder being movable forward and backward in a direction of an optical axis of the lens within the casing;

a movable member at a side of the lens holder that moves parallel to the direction of the optical axis together with the lens holder;

a control knob adjacent to the lens holder and rotatably coupled on the casing;

a lower cover fixed to a first side of the casing; and an upper cover fixed to a second side of the casing and coupled to the lower cover while facing to the lower cover, wherein the movable member is connected to the control knob in such a manner that as the control knob is rotated, the movable member moves parallel to the direction of the optical axis, thereby moving the lens holder forward and backward in the direction of the optical axis, and wherein the control knob is rotatably installed between the lower cover and the upper cover.

10. The focusing device as claimed in claim 9, further comprising:

a guide pin coupled through the movable member, wherein the guide pin is fixed to on of the lower cover and the upper cover, parallel to the direction of the optical axis, and guides the movable member to be moved along the direction of the optical axis.

11. The focusing device as claimed in claim 9, further comprising:

first and second rotary pins formed on opposite sides of the control knob, respectively, wherein the first rotary pin is rotatably coupled to the lower cover, and the second rotary pins is rotatably coupled to the upper cover.

12. The focusing device as claimed in claim 11, further comprising:

a coupling piece extending from a side surface of the movable member;

a bore formed in the coupling piece; and a coupling protrusion formed to surround one of the rotary pins, the coupling protrusion being eccentrically rotated about an axis of rotation of the control knob as the control knob is rotated, wherein the coupling protrusion is positioned within the bore so that as the control knob is rotated, the coupling protrusion is moved rectilinearly within the bore and pushes against opposite inner walls of the bore, thereby moving the movable member.

13. The focusing device as claimed in claim 12, wherein a length of the bore is longer than two times of a radius of rotation of the coupling protrusion.

14. The focusing device as claimed in claim 1, wherein a length of the bore is longer than two times of a radius of rotation of the coupling protrusion.

15. The focusing device as claimed in claim 3, wherein a length of the bore is longer than two times of a radius of rotation of the coupling protrusion.

* * * * *